United States Patent
Ogura et al.

(10) Patent No.: US 8,084,389 B2
(45) Date of Patent: Dec. 27, 2011

(54) SULFUR STORAGE CATALYST

(75) Inventors: Yoshitsugu Ogura, Toyota (JP);
Takayuki Endo, Toyota (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 0 days.

(21) Appl. No.: 12/596,263

(22) PCT Filed: Apr. 17, 2008

(86) PCT No.: PCT/JP2008/057514
§ 371 (c)(1),
(2), (4) Date: Oct. 16, 2009

(87) PCT Pub. No.: WO2008/133180
PCT Pub. Date: Nov. 6, 2008

(65) Prior Publication Data
US 2010/0137132 A1    Jun. 3, 2010

(30) Foreign Application Priority Data
Apr. 20, 2007  (JP) .................. 2007-112076

(51) Int. Cl.
*B01J 20/00* (2006.01)
*B01J 21/00* (2006.01)
*B01J 23/00* (2006.01)

(52) U.S. Cl. ........ 502/328; 502/326; 502/327; 502/330; 502/332; 502/333; 502/334; 502/339; 502/340; 502/341; 502/344; 502/349; 502/350; 502/351; 502/355; 502/415; 502/439; 502/527.12; 502/527.13

(58) Field of Classification Search ................. 502/326, 502/327, 328, 332, 333, 334, 339, 340, 341, 502/344, 349, 350, 351, 355, 415, 439, 527.12, 502/527.13
See application file for complete search history.

(56) References Cited

U.S. PATENT DOCUMENTS

| | | | | |
|---|---|---|---|---|
| 5,525,307 A | * | 6/1996 | Yasaki et al. | 422/171 |
| 5,591,414 A | * | 1/1997 | Jacob et al. | 422/180 |
| 6,217,831 B1 | * | 4/2001 | Suzuki et al. | 422/177 |
| 6,272,848 B1 | * | 8/2001 | Okude et al. | 60/274 |
| 6,335,305 B1 | * | 1/2002 | Suzuki et al. | 502/325 |

(Continued)

FOREIGN PATENT DOCUMENTS

EP    1 949 959    7/2008

(Continued)

OTHER PUBLICATIONS

Notification of Reasons for Refusal for Japanese Patent Appl. No. 2007-112076 dated May 17, 2011.

(Continued)

*Primary Examiner* — Cam N. Nguyen
(74) *Attorney, Agent, or Firm* — Finnegan, Henderson, Farabow, Garrett & Dunner, LLP

(57) ABSTRACT

A noble metal is supported on an upstream-side catalytic portion 20 at least, and an $SO_x$ storage material, such as Mg and K that lower the noble metal's activities, is supported on a downstream-side catalytic portion 21. The noble metal being supported on the upstream-side catalytic portion 20 oxidizes $SO_2$ efficiently to turn it into $SO_x$, because the lowering of oxidizing activities is suppressed. These $SO_x$ are retained by means of storage in the $SO_x$ storage material being loaded on the downstream-side catalytic portion 21. Therefore, the $SO_x$ storing performance improves, and it is good in terms of durability as well.

4 Claims, 5 Drawing Sheets

U.S. PATENT DOCUMENTS

| | | | |
|---|---|---|---|
| 6,375,910 B1 * | 4/2002 | Deeba et al. | 423/239.1 |
| 6,440,378 B1 * | 8/2002 | Hirata et al. | 423/239.1 |
| 6,497,848 B1 * | 12/2002 | Deeba et al. | 422/180 |
| 6,514,905 B1 * | 2/2003 | Hanaki et al. | 502/328 |
| 6,596,243 B1 * | 7/2003 | Fujii et al. | 422/177 |
| 6,777,370 B2 * | 8/2004 | Chen | 502/241 |
| 6,806,225 B1 * | 10/2004 | Ikeda et al. | 502/326 |
| 6,866,834 B2 * | 3/2005 | Nakamura et al. | 423/239.1 |
| 6,967,186 B2 * | 11/2005 | Takaya et al. | 502/325 |
| 7,022,646 B2 * | 4/2006 | Li | 502/339 |
| 7,220,702 B2 * | 5/2007 | Hara et al. | 502/327 |
| 7,229,947 B2 * | 6/2007 | Hara et al. | 502/327 |
| 7,276,212 B2 * | 10/2007 | Hu et al. | 422/177 |
| 7,306,771 B2 * | 12/2007 | Okawara | 422/177 |
| 7,329,629 B2 * | 2/2008 | Gandhi et al. | 502/325 |
| 7,344,683 B2 * | 3/2008 | Miyoshi et al. | 422/172 |
| 7,374,729 B2 * | 5/2008 | Chen et al. | 422/177 |
| 7,446,076 B2 * | 11/2008 | Miyoshi et al. | 502/326 |
| 7,517,510 B2 * | 4/2009 | Chen et al. | 423/213.2 |
| 7,550,124 B2 * | 6/2009 | Chen et al. | 423/213.2 |
| 7,576,031 B2 * | 8/2009 | Beutel et al. | 502/339 |
| 7,598,205 B2 * | 10/2009 | Suzuki | 502/325 |
| 7,740,817 B2 * | 6/2010 | Matsumoto et al. | 423/213.2 |
| 7,749,472 B2 * | 7/2010 | Chen et al. | 423/213.2 |
| 7,767,163 B2 * | 8/2010 | LaBarge et al. | 422/171 |
| 7,795,172 B2 * | 9/2010 | Foong et al. | 502/327 |
| 7,825,063 B2 * | 11/2010 | Takeuchi et al. | 502/302 |
| 2002/0131914 A1 * | 9/2002 | Sung | 422/177 |
| 2006/0057046 A1 * | 3/2006 | Punke et al. | 423/215.5 |

FOREIGN PATENT DOCUMENTS

| | | |
|---|---|---|
| JP | 9-881 | 1/1997 |
| JP | 11-350945 | 12/1999 |
| JP | 2001-347139 | 12/2001 |
| JP | 2002-295244 | 10/2002 |
| JP | 2003-245523 | 9/2003 |
| JP | 2004-181374 | 7/2004 |
| JP | 2004-211566 | 7/2004 |
| JP | 2006-144624 | 6/2006 |

OTHER PUBLICATIONS

Extended European Search Report for EP Application No. 08740584.1 dated Sep. 27, 2011.

* cited by examiner

SULFUR STORAGE CATALYST

CROSS-REFERENCE TO RELATED APPLICATIONS

This application is a national phase application of International Application No. PCT/JP2008/057514, filed Apr. 17, 2008, and claims the priority of Japanese Application No. 2007-112076, filed Apr. 20, 2007, the contents of both of which are incorporated herein by reference.

TECHNICAL FIELD

The present invention relates to a sulfur storage catalyst that stores sulfur component in automotive exhaust gas to prevent it from flowing out to a downstream side. A sulfur storage catalyst according to the present invention is put in place on an upstream side of $NO_x$ storage-and-reduction type catalyst, for instance, and can then be used in order to prevent the sulfur poisoning of the $NO_x$ storage-and-reduction type catalyst.

BACKGROUND ART

An $NO_x$ storage-and-reduction type catalyst has been used as a catalyst for converting exhaust gas for lean-burn engine application. This $NO_x$ storage-and-reduction type catalyst stores $NO_x$ in lean atmosphere, and reduces and then converts $NO_x$, which have been released from an $NO_x$ storage material at the time of rich spiking, by means of reducing components, such as HC, which exist abundantly in the atmosphere. The $NO_x$ storage material, which has released $NO_x$, recovers the $NO_x$ storing capability, and stores $NO_x$ again in the subsequent lean atmosphere.

An $NO_x$ storage material comprises an alkali metal or alkaline-earth metal, and reacts with $NO_x$ to turn into the nitrates or nitrites and thereby stores $NO_x$ therein. However, the sulfur component ($SO_2$), which arises from fuel, is included in exhaust gas. This sulfur component turns into $SO_x$ on catalyst, absorbs moisture in the exhaust gas to generate sulfuric-acid ions and sulfurous-acid ions, and then these react with the $NO_x$ storage material to generate sulfates and sulfites. Since these sulfates have extremely high decomposition temperatures compared with those of nitrates, it is difficult for the $NO_x$ storage material that has turned into the sulfates to release $SO_x$. Consequently, there is such a problem that the $NO_x$ storage material, which has turned into the sulfates, loses the $NO_x$ storing capability and thereby the $NO_x$ converting performance of $NO_x$ storage-and-reduction catalyst lowers gradually. This phenomenon is referred to as the "sulfur poisoning."

In order to solve this problem, an exhaust-gas converting apparatus in which an $SO_x$ absorption agent is put in place on an upstream side of an $NO_x$ storage-and-reduction type catalyst and a reducing-agent supplying means is put in place on a furthermore upstream side of the $SO_x$ absorption agent is proposed in Japanese Unexamined Patent Publication (KOKAI) Gazette No. 2006-144,624, for instance. In the same gazette, as for the $SO_x$ absorption agent that retains them in the form of stable sulfates, a sulfur storage catalyst is exemplified, sulfur storage catalyst in which an alkali component, such as K, Na, Cs and Ca, and a noble metal, such as Pt, are supported on a support that comprises alumina.

However, in such a sulfur storage catalyst on which an alkali component and a noble metal, such as Pt, are supported, there has been such a drawback that the oxidizing activities of the noble metal are lowered by means of the alkali component. Accordingly, the reaction activity of oxidizing $SO_2$ to turn it into $SO_x$ at the time of use lowers gradually, and $SO_2$, which has not been stored, has flowed out to the downstream side. Consequently, $SO_x$ has flowed into the $NO_x$ storage-and-reduction type catalyst that is put in place on the downstream side, and thereby it becomes difficult to prevent the sulfur poisoning.

Patent Literature No. 1: Japanese Unexamined Patent Publication (KOKAI) Gazette No. 2006-144,624

DISCLOSURE OF THE INVENTION

Assignment to be Solved by the Invention

The present invention is one which has been done in view of the aforementioned circumstances, and it is an assignment to be solved to adapt a sulfur storage catalyst into one whose storing performance for $SO_x$ is improved by suppressing the lowering of noble metal's oxidizing activities, and which is good in terms of durability.

Means for Solving the Assignment

A characteristic of a sulfur storage catalyst according to the present invention which solves the aforementioned assignment lies in that it comprises:
a support substrate;
a coating layer comprising a porous oxide, and being formed on a surface of the support substrate;
a noble metal being supported on the coating layer; and
an $SO_x$ storage material being selected from the group consisting of alkali metals and alkaline-earth metals, and being supported on the coating layer;
it stores sulfur component in exhaust gas as sulfur oxide; and
it has:
an upstream-side catalytic portion in which at least the noble metal is supported on an exhaust-gas upstream side of the coating layer; and
a downstream-side catalytic portion in which an $SO_x$ storage material being selected from the group consisting of Mg, K, Na, Sr and Ca is supported on the coating layer on an exhaust-gas downstream side of the upstream-side catalytic portion.

It is desirable that the downstream-side catalytic portion can be supported in a range of $\frac{1}{10}$-$\frac{1}{2}$ of an overall length of the support substrate from a downstream-side end surface of the support substrate toward an upstream side thereof.

Moreover, it is desirable that a supporting amount of the $SO_x$ storage material being selected from the group consisting of Mg, K, Na, Sr and Ca can be set to 0.1-0.5 mol per 1-liter volume of the support substrate.

Further, it is desirable that Ba can be supported on the upstream-side catalytic portion.

Effect of the Invention

An $SO_x$ storage material that is selected from the group consisting of Mg, K, Na, Sr and Ca exhibits the action of lowering the oxidizing activities of noble metal, such as Pt, especially greatly. Hence, in the sulfur storage catalyst according to the present invention, a noble metal is supported on an exhaust-gas upstream side of the coating layer at least, namely, on the upstream-side catalytic portion, and an $SO_x$ storage material that is selected from the group consisting of Mg, K, Na, Sr and Ca is supported on an exhaust-gas downstream side of the coating layer, namely, on the downstream-side catalytic potion. Therefore, the noble metal that is supported on the upstream-side catalytic portion oxidizes $SO_x$ efficiently to turn it into $SO_x$, because it is not affected by the $SO_x$ storage material that is selected from the group consisting of Mg, K, Na, Sr and Ca so that the lowering of the oxidizing activities is suppressed. These $SO_x$ are retained by means of storage in the $SO_x$ storage material which is loaded on the downstream-side catalytic portion, and which is selected from the group consisting of Mg, K, Na, Sr and Ca.

Specifically, in accordance with the sulfur storage catalyst according to the present invention, the flowing out of $SO_2$ to the downstream side hardly occurs, because it is possible to oxidize and then turn $SO_2$ in exhaust gas into $SO_x$ in the total amount virtually and then to retain them in the $SO_x$ storage material by means of storage. Therefore, it is possible to prevent the sulfur poisoning of the $NO_x$ storage-and-reduction type catalyst that is put in place on the downstream side, and thereby it is possible to suppress the emission of $NO_x$ into the atmosphere greatly.

And, when Ba is supported on the upstream-side catalytic portion, it is possible to store $SO_x$ even on an upstream side of the downstream-side catalytic portion, because Ba exhibits high sulfur storing capability and does not lower the oxidizing activities of noble metal in addition to that. Therefore, it is possible to augment the $SO_x$ storing amount furthermore.

Moreover, the sulfur storage catalyst according to the present invention has such a characteristic that it is likely to store $SO_x$ and it is less likely to release stored $SO_x$. And, it is possible to support an $SO_x$ storage material in an amount, which is sufficient for storing a total sulfur amount that is emitted during the usual traveling of automobile. Therefore, the operation for recovering the $SO_x$ storing capability becomes unnecessary, and the control thereof becomes easy, and additionally the mileage improves.

EXPLANATION OF REFERENCE NUMERALS

Figure 1:
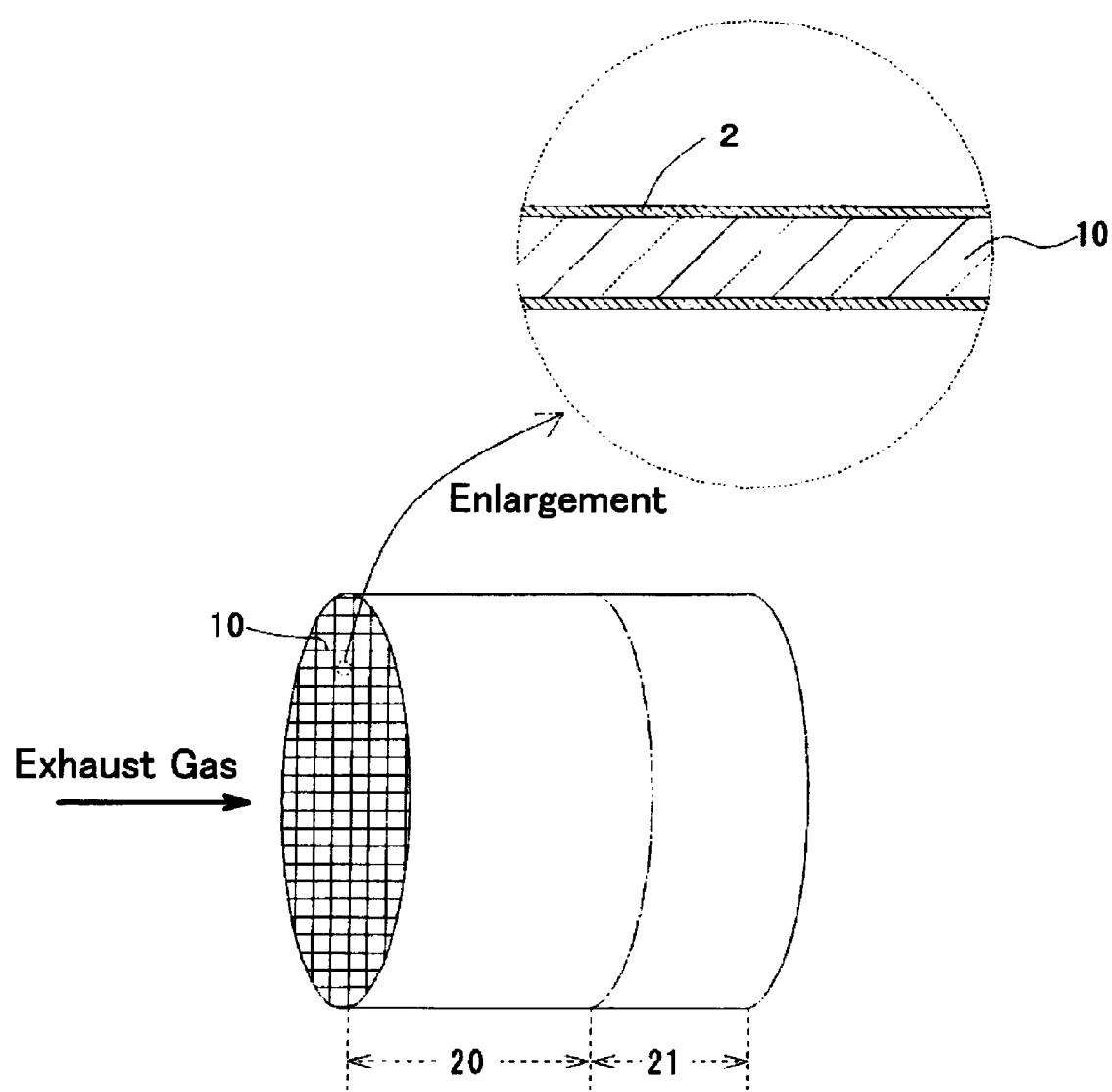
FIG. 1 is a schematic explanatory diagram for illustrating a sulfur storage catalyst according to an example of the present invention.

1: Support Substrate; 2: Catalytic Coating Layer; 10: Cellular Partition Walls;
20: Upstream-side Catalytic Portion; and 21: Downstream-side Catalytic Portion

BEST MODE FOR CARRYING OUT THE INVENTION

A sulfur storage catalyst according to the present invention comprises a support substrate, a coating layer that is formed on a surface of the support substrate, and a noble metal and an $SO_x$ storage material that are supported on the coating layer.

The support substrate is one which determines the catalyst's configuration, and can be adapted into honeycomb shapes, foam shapes, pellet shapes, and the like; however, straight-flow structure honeycomb configurations with a large number of cellular passages are especially preferable, straight-flow structure honeycomb configurations which offer a favorable balance between the pressure loss and the contactability between exhaust gas and catalyst. Moreover, depending on cases, it is feasible to adapt it into a filter structure honeycomb body whose cellular partition walls have a filtering action. As for the support substrate's material quality, it is possible to use ceramic, such as cordierite and SiC, or metal.

The coating layer that is formed on a surface of the support substrate is formed of a porous oxide in order to support a noble metal and an $SO_x$ storage material thereon. As for the porous oxide, it is possible to use one that is selected from the group consisting of alumina, titania, zirconia, ceria, and the like; and it is possible to select one from the group consisting of the simple substances, mixtures and composite oxide of these to use. It is especially desirable to use active alumina with large specific surface area, or zirconia whose basicity is high, and so forth.

In order to form the coating layer on a surface of the support substrate, it is possible to form it with ease by using a slurry, which includes a porous oxide powder and a binder, and then doing wash coating. Note that a forming amount of the coating layer can be set to 30 g-350 g per 1-liter apparent volume of the support substrate in the case of a honeycomb-configured support substrate, for instance. When the forming amount of the coating layer is less than 30 g/L, it becomes difficult to support a noble metal in a sufficient amount. Moreover, when the forming amount of the coating layer becomes greater than 350 g/L, it is not preferable because the pressure loss rises.

Note that the "apparent volume" means a true volume in the case of pellet-configured support substrate; and it means a volume that includes the capacity of cellular passages in the case of honeycomb-configured support substrate.

As for the noble metal, although it is possible to select it from the group consisting of Pt, Rh, Pd, and the like, to use, it is desirable to use Pt whose oxidizing activity for $SO_2$ is especially high. It is desirable to support the noble metal in an amount of 0.2-2.0 g per 1-liter apparent volume of the support substrate. This noble metal contributes to the oxidation reaction of $SO_2$ mainly; however, since it also has the function of oxidizing HC and CO in exhaust gas as well, the sulfur storage catalyst according to the present invention contributes to the conversion of these as well.

The noble metal is supported on an exhaust-gas upstream side of the coating layer at least, and thereby the upstream-side catalytic portion is formed. By doing thusly, it is possible to avoid the adverse effect that results from the $SO_x$ storage material that is supported on the downstream-side catalytic portion and is selected from the group consisting of Mg, K, Na, Sr and Ca, and thereby it is possible for the noble metal to demonstrate the oxidizing activities sufficiently. However, the present invention is not one which excludes a sulfur storage catalyst in which a noble metal is further supported on the downstream-side catalytic portion.

In the sulfur storage catalyst according to the present invention, an $SO_x$ storage material that is selected from the group consisting of Mg, K, Na, Sr and Ca is supported selectively on an exhaust-gas downstream side of the coating layer, and thereby the downstream-side catalytic layer is formed. It is possible to securely suppress the lowering of the noble metal's oxidizing activities by thus supporting these $SO_x$ storage materials separately from the noble metal that is supported on the upstream-side catalytic portion, because these exhibit the action of lowering the noble metal's oxidizing activities especially highly. Among them, Mg exhibits high $SO_x$ storing capability, and is less likely to release stored $SO_x$. That is, Mg is likely to turn into the sulfate, and the decomposition temperature of its sulfate is high. Therefore, as for a downstream-side $SO_x$ storage material, it is desirable to include Mg at least.

It is desirable that the $SO_x$ storage material that is selected from the group consisting of Mg, K, Na, Sr and Ca can be supported in a range of 1/10-1/2 of an overall length of the support substrate from a downstream-side end surface of the support substrate toward an upstream side thereof. In other words, it is desirable that the downstream-side catalytic portion can be formed in a range of 1/10-1/2 of an overall length of the support substrate from a downstream-side end surface of the support substrate toward an upstream side thereof. When the range of the downstream-side catalytic portion is less than 1/10 of an overall length of the support substrate, the $SO_x$ storing capability lowers because it becomes difficult to store $SO_x$, which are generated on the upstream side, on the downstream side sufficiently. Moreover, when forming the downstream-side catalytic portion in excess of 1/2 of the overall length, the $SO_x$ generating capability lowers and then the $SO_x$ storing capability lowers because the noble metal with lowered oxidizing activities increases.

It is desirable to set a supporting amount of the $SO_x$ storage material that is selected from the group consisting of Mg, K, Na, Sr and Ca to 0.1-0.5 mol per 1-liter apparent volume of the support substrate. When being less than 0.1 mol/L, the $SO_x$ storing amount is not sufficient; and, after the $SO_x$ storing amount saturates, the $SO_x$ storage material has come to be present excessively even when supporting it in excess of 0.5 mol/L.

It is desirable to support an $SO_x$ storage material, which is less likely to lower the noble metal's oxidizing activities, on the upstream-side catalytic portion. As for this $SO_x$ storage material that is supported on the upstream-side catalytic portion, it is desirable to include Ba at least. Ba can be used especially preferably, because it does not lower the noble metal's oxidizing activities, and because the $SO_x$ adsorbing capability is also as high as that of Mg virtually.

It is desirable to set a supporting amount of the $SO_x$ storage material that is supported on the upstream-side catalytic portion, namely, the $SO_x$ storage material that Ba represent, to 0.05-0.5 mol per 1-liter apparent volume of the support substrate. When being less than 0.05 mol/L, the $SO_x$ storing amount is not sufficient; and, after the $SO_x$ storing amount saturates, the $SO_x$ storage material has come to be present excessively even when supporting it in excess of 0.5 mol/L.

Note that, although it should not be done to make an $SO_x$ storage material that is selected from the group consisting of Mg, K, Na, Sr and Ca coexist in the upstream-side catalytic portion, it is feasible to make Ba coexist in the downstream-side catalytic portion.

EXAMPLES

Hereinafter, the present invention will be explained concretely by means of an example and a comparative example.

Example No. 1

In FIG. 1, there is illustrated a sulfur storage catalyst that is directed to Example No. 1 according to the present invention. The sulfur storage catalyst comprises a straight-flow honeycomb-configured support substrate 1 that is equipped with a large number of cross-sectionally quadrangular cellular passes, and a catalytic coating layer 2 that is formed on the surfaces of its cellular partition walls 10. An upstream-side catalytic portion 20 on which Ba and Pt are supported is formed on an exhaust-gas upstream side of the catalytic coating layer 2, and a downstream-side catalytic portion 21 on which Mg, Ba and Pt are supported is formed on its downstream side. The downstream-side catalytic portion 21 is formed in a range of 3/10 of the overall length of the support substrate 1 from the outlet-gas-side end surface of the support substrate 1.

Figure 2:
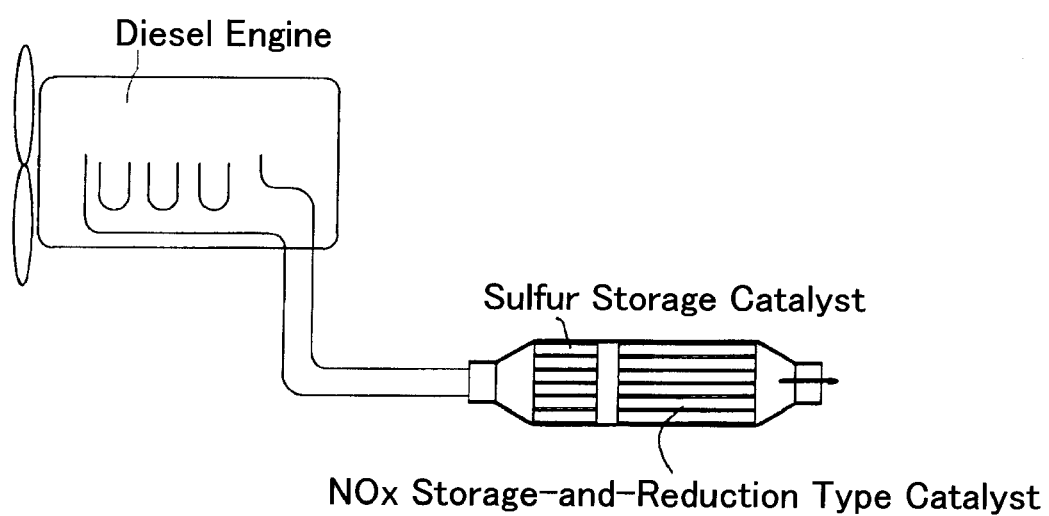
FIG. 2 is an explanatory diagram of an exhaust-gas converting apparatus that utilizes a sulfur storage catalyst according to an example of the present invention.

As illustrated in FIG. 2, this sulfur storage catalyst is put in place on an exhaust-gas upstream side of an $NO_x$ storage-and-reduction type catalyst in the exhaust system of diesel engine in order to use.

Hereinafter, a production process for this sulfur storage catalyst will be explained instead of detailed explanations on the construction.

First of all, a slurry was prepared, slurry which included an alumina powder in an amount of 50 parts by mass, a zircon powder in an amount of 95 parts by mass, an alumina sol in an amount of 5 parts by mass and water; and was wash coated onto the support substrate 1 (diameter: 30 mm, length: 50 mm, and 600 cells/in$^2$) that was formed of cordierite; thereby forming a coating layer on the surfaces of the cellular partition walls 10. The coating layer was formed in an amount of 150 g per 1-liter apparent volume of the support substrate 1.

Next, the entirety of the coating layer was impregnated with a predetermined amount of a dinitrodiammine platinum nitrate aqueous solution with a predetermined concentration, and was dried at 120° C. for 1 hour and then at 300° C. for 2 hours to support Pt onto the entirety uniformly. The supporting amount of Pt was 2.0 g per 1-liter apparent volume of the support substrate 1.

Subsequently, a range of 7/10 of the overall length of the substrate 1 from the inlet-gas-side end surface of the coating layer was impregnated with a predetermined amount of a barium acetate aqueous solution with a predetermined concentration, and was dried at 120° C. for 1 hour and then at 300° C. for 2 hours, thereby forming the upstream-side catalytic portion 20 in which Ba was supported uniformly on the upstream side alone. The supporting amount of Ba in the upstream-side catalytic potion 20 was 0.3 mol per 1-liter apparent volume of the support substrate 1.

Further, only a range of 3/10 of the overall length of the substrate 1 from the outlet-gas-side end surface was impregnated with a predetermined amount of a mixture aqueous solution of magnesium acetate and barium acetate with predetermined concentrations, and was dried at 120° C. for 1 hour and then at 300° C. for 2 hours, thereby supporting Ba and Mg onto the downstream side alone to form the downstream-side catalytic portion 21. The supporting amounts of Ba and Mg in the downstream-side catalytic potion 21 were 0.3 mol per 1-liter apparent volume of the support substrate 1 for both of them. Eventually, calcination was done at 500° C. for 1 hour in an electric furnace.

Comparative Example No. 1

Using a support substrate 1 on which a coating layer was formed in the same manner as Example No. 1, Pt was supported onto the entirety uniformly in the same manner as Example No. 1. Next, the entirety was impregnated with a predetermined amount of a mixture aqueous solution of magnesium acetate and barium acetate with predetermined concentrations, and was dried at 120° C., for 1 hour and then at 300° C., for 2 hours, thereby supporting Ba and Mg onto the entirety uniformly. The supporting amounts of Ba and Mg were 0.3 mol per 1-liter apparent volume of the support substrate 1 for both of them. Eventually, calcination was done at 500° C., for 1 hour in an electric furnace.

Testing Example No. 1

The constructions of the sulfur storage catalysts according to Example No. 1 and Comparative Example No. 1 are given in Table 1 all together.

TABLE 1

| | Upstream-side Catalytic Portion | | Downstream-side Catalytic Portion | |
| --- | --- | --- | --- | --- |
| | Range | Supported Metal | Range | Supported Metal |
| Ex. No. 1 | 7/10 | Pt & Ba | 3/10 | Pt, Ba & Mg |
| Comp. Ex. No. 1 | Uniformly Supported Pt, Ba & Mg on Entirety | | | |

Figure 3:
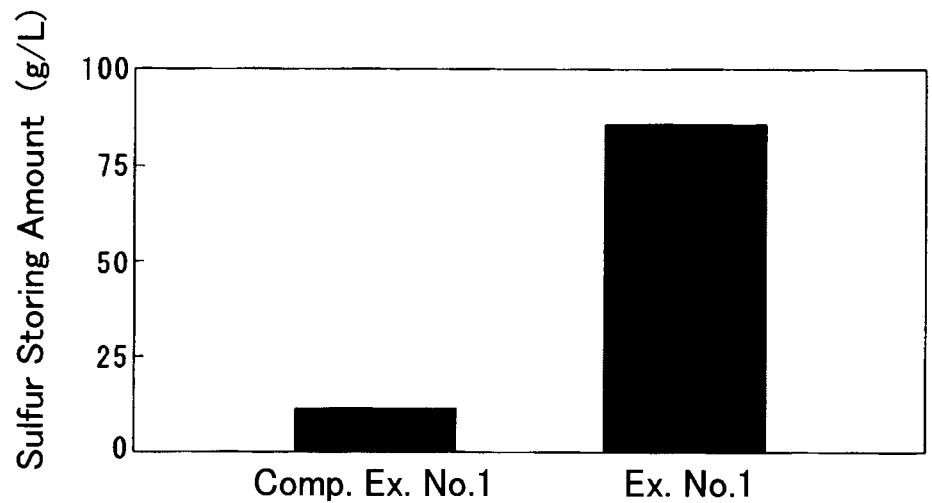
FIG. 3 is a graph for showing sulfur storing amounts.

The sulfur storage catalysts according to Example No. 1 and Comparative Example No. 1 were put in place in an evaluating apparatus. At this time, with regard to the sulfur storage catalyst according to Example No. 1, the upstream-side catalytic portion 20 is put in place so as to be positioned on an exhaust-gas upstream side, and the downstream-side catalytic portion 21 was put in place so as to be positioned on an exhaust-gas downstream side. And, a lean model gas given in Table 2 was distributed in a flow volume of 30 L/min. at 400° C. in a stationary mode for 15 hours to measure sulfur storing amounts. The results are illustrated in FIG. 3.

TABLE 2

| | $SO_2$ (ppm) | $C_3H_6$ (ppmC) | $O_2$ (%) | NO (ppm) | $CO_2$ (%) | $H_2O$ (%) | $N_2$ |
| --- | --- | --- | --- | --- | --- | --- | --- |
| Lean Gas | 125 | 200 | 10 | 200 | 10 | 5 | Balance |

Figure 4:
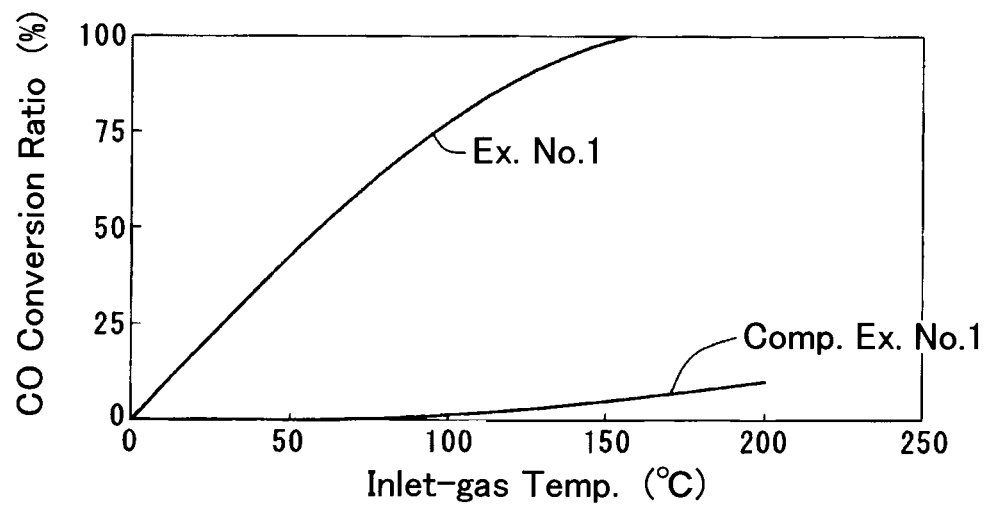
FIG. 4 is a graph for showing relationships between temperatures and CO conversion ratios.

Moreover, the sulfur storage catalysts according to Example No. 1 and Comparative Example No. 1 were put in place in the same manner as aforementioned, and then their CO conversion ratios were measured continuously under the conditions that a lean model gas given in Table 3 was subjected to a temperature rise to 50° C.-300° C. at a rate of 30° C./min. in a flow volume of 30 L/min. The results are illustrated in FIG. 4.

TABLE 3

| | $C_3H_6$ (ppmC) | $O_2$ (%) | CO (ppm) | NO (ppm) | $CO_2$ (%) | $H_2O$ (%) | $N_2$ |
| --- | --- | --- | --- | --- | --- | --- | --- |
| Lean Gas | 3000 | 10 | 300 | 200 | 10 | 5 | Balance |

From FIG. 3, it is understood that the sulfur storing amount increased by about 8 times in the sulfur storage catalyst according to Example No. 1 compared with that in Comparative Example No. 1, and it is apparent that this is an effect that results from forming the upstream-side catalytic portion 20 and downstream-side catalytic portion 21.

Moreover, from FIG. 4, the sulfur storage catalyst according to Example No. 1 exhibited a high CO conversion performance, compared with that of Comparative Example No. 1, from low-temperature region. This means that the oxidizing activity of Pt was high in the sulfur storage catalyst according to Example No. 1 compared with that in Comparative Example; and indicates that the high activities of Pt were maintained in the sulfur storage catalyst according to Example No. 1.

Specifically, it is apparent that, since the lowering of Pt's activities was suppressed in the sulfur storage catalyst according to Example No. 1, the sulfur storing amount became greater.

Testing Example No. 2

In the same manner as Example No. 1, sulfur storage catalysts whose ratios between the upstream-side catalytic portion 20 and the downstream-side catalytic portion 21 differed were prepared. To be concrete, the catalysts were prepared at six levels, namely, with a range of the downstream-side catalytic portion 21 being zero, and 1/10, 3/10, 1/2, 7/10 and 1/1 of the overall length of the support substrate 1, respectively. The supporting amount of Mg in the downstream-side catalytic portion 21 was the same as that of Example No. 1 in all of them. Note that no Mg was supported in one with a range of the downstream-side catalytic portion 21 being zero, and that one with that being 1/1 was the same catalyst as Comparative Example No. 1.

Figure 5:
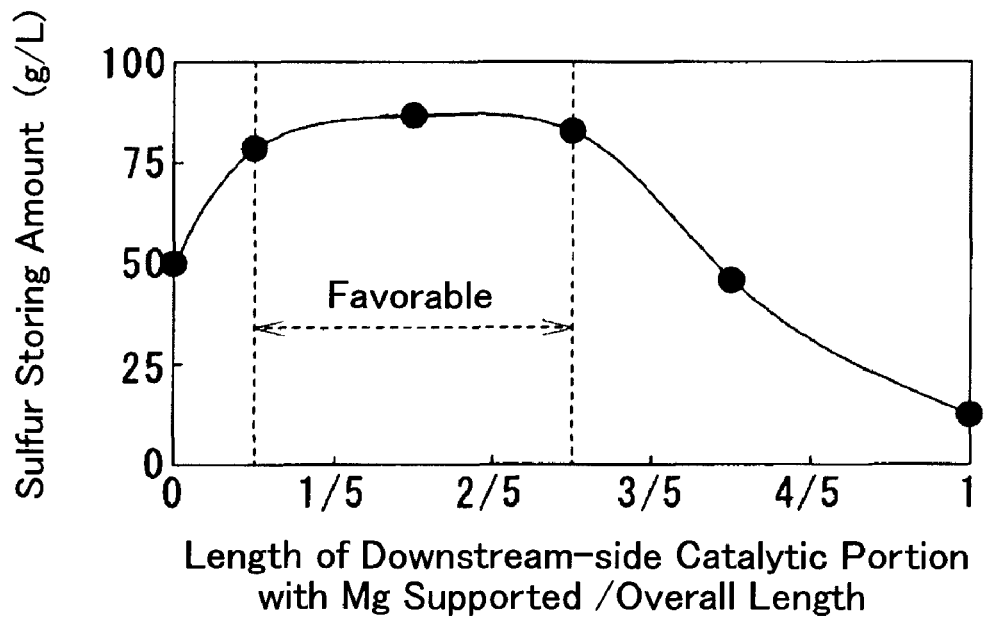
FIG. 5 is a graph for showing a relationship between the ranges of downstream-side catalytic portion and the sulfur storing amounts.

These sulfur storage catalysts were measured for their sulfur storing amounts in the same manner as Testing Example No. 1. The results are illustrated in FIG. 5. Moreover, their CO conversion ratios at 150° C. were measured in the same manner as Testing Example No. 1, and the results are illustrated in FIG. 6.

Figure 6:
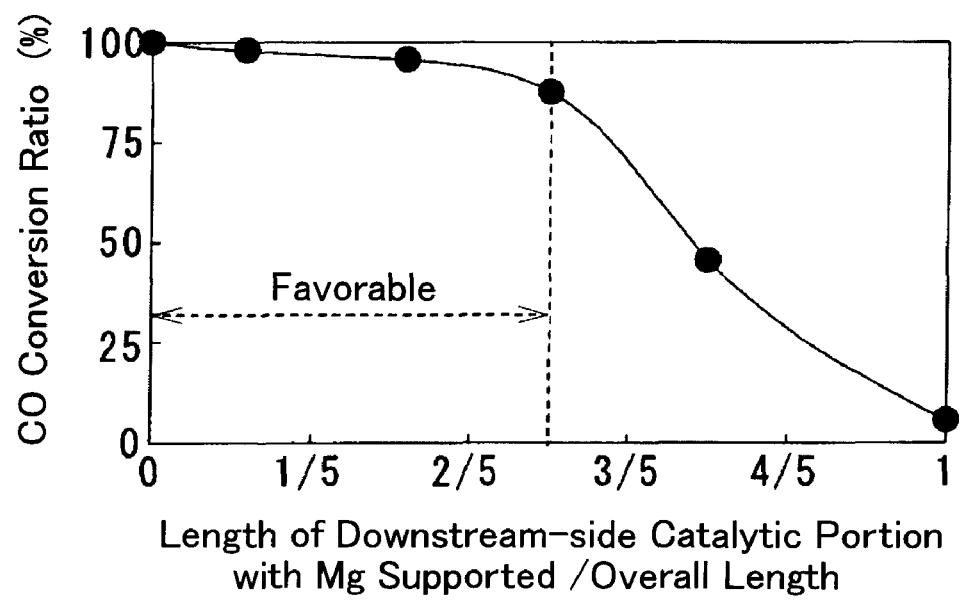
FIG. 6 is a graph for showing a relationship between the ranges of downstream-side catalytic portion and the CO conversion ratios (an activity of Pt)

From FIG. 5 and FIG. 6, it is understood that the range of the downstream-side catalytic portion 21 can preferably fall in a range of 1/10-1/2 of the overall length of the support substrate 1. And, it is understood that, when the range of the downstream-side catalytic portion 21 was smaller than 1/10 of the overall length of the support substrate 1, the sulfur storing amount was less, though the oxidizing activity of Pt was favorable. Moreover, it is understood that, when the range of the downstream-side catalytic portion 21 was larger than 1/2 of the overall length of the support substrate 1, the sulfur storing amount became less, because the oxidizing activity of Pt lowered so that the generating amount of $SO_x$ lowered.

Testing Example No. 3

Next, the influence of the Mg supporting amount was investigated. Specifically, catalysts were prepared at 6 levels, namely, setting the Mg supporting amount in the downstream-side catalytic portion 21 to zero, 0.05 mol/L, 0.1 mol/

L, 0.3 mol/L, 0.5 mol/L and 1.0 mol/L, respectively, while making the range of the downstream-side catalytic portion 21 constant at 3/10 in the sulfur storage catalyst according to Example No. 1.

Figure 7:
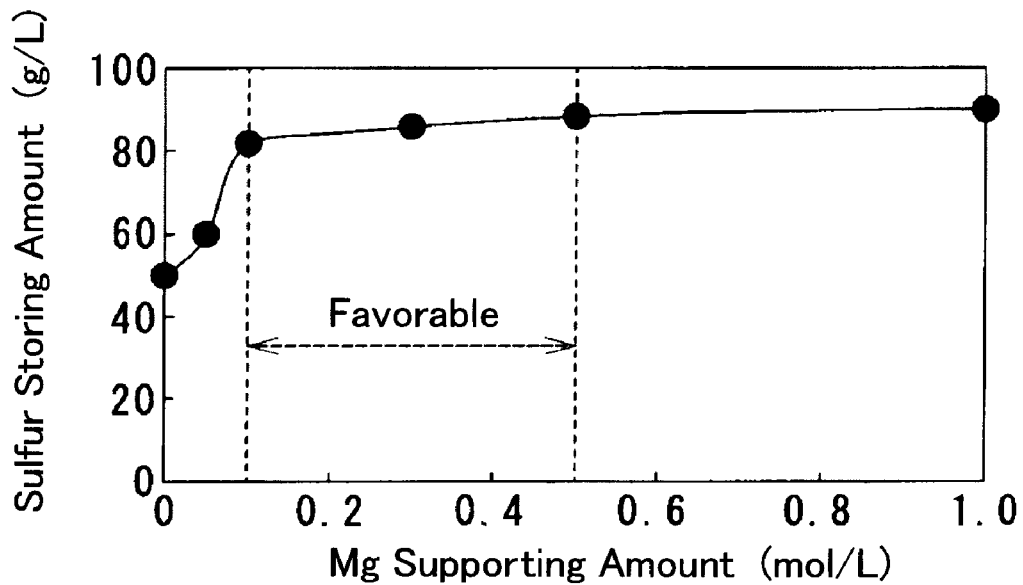
FIG. 7 is a graph for showing a relationship between the supporting amounts of Mg in downstream-side catalytic portion and the sulfur storing amounts.
Figure 8:
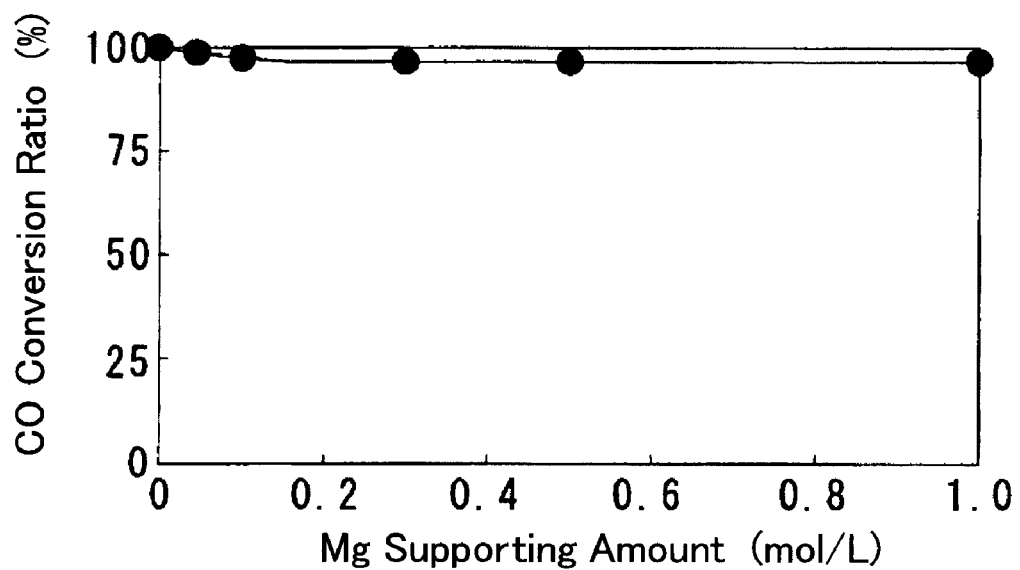
FIG. 8 is a graph for showing a relationship between the supporting amounts of Mg in downstream-side catalytic portion and the CO conversion ratios (an activity of Pt).

In the same manner as Testing Example NO. 2, these sulfur storage catalysts were measured for their sulfur storing amounts, and their CO conversion ratios at 150° C., and the results are illustrated in FIG. 7 and FIG. 8, respectively.

From FIG. 7, it is understood that the Mg supporting amount in the downstream-side catalytic portion 21 can preferably fall in a range of 0.1-0.5 mol/L. And, when the Mg supporting amount in the downstream-side catalytic portion 21 was less than 0.1 mol/L, the sulfur storing amount was low as a whole, because the sulfur storing amount resulting from Mg could not be secured; and the sulfur storing amount saturated even when the Mg supporting amount surpassed 0.5 mol/L. From FIG. 8, the activity of Pt was constant virtually, regardless of the Mg supporting amounts. This was due to making the range of the downstream-side catalytic portion 21 constant, and indicates that Pt in the upstream-side catalytic portion 20 was not affected by Mg in the downstream-side catalytic portion 21.

INDUSTRIAL APPLICABILITY

It is possible not only to put the sulfur storage catalyst according to the present invention in place on an exhaust-gas upstream side of $NO_x$ storage-and-reduction type catalyst to use, but also to use it independently.

The invention claimed is:

1. A sulfur storage catalyst comprising:
    a support substrate;
    a coating layer comprising a porous oxide, and being formed on a surface of the support substrate;
    a noble metal being supported on the coating layer; and
    an $SO_x$ storage material being selected from the group consisting of alkali metals and alkaline-earth metals, and being supported on the coating layer;
    the sulfur storage catalyst being put in place on an exhaust-gas upstream side of $NO_x$ storage-and-reduction type catalyst to be used, and storing sulfur component in exhaust gas as sulfur oxide;
    wherein the sulfur storage catalyst has:
    an upstream-side catalytic portion in which at least the noble metal is supported and no $SO_x$ storage material being selected from the group consisting of Mg, K, Na, Sr and Ca is supported on an exhaust-gas upstream side of the coating layer; and
    a downstream-side catalytic portion in which an $SO_x$ storage material being selected from the group consisting of Mg, K, Na, Sr and Ca is supported on the coating layer on an exhaust-gas downstream side of the upstream-side catalytic portion.

2. The sulfur storage catalyst as set forth in claim 1, wherein said downstream-side catalytic portion is formed in a range of 1/10-1/2 of an overall length of said support substrate from a downstream-side end surface of said support substrate toward an upstream side thereof.

3. The sulfur storage catalyst as set forth in claim 1 or claim 2, wherein a supporting amount of said $SO_x$ storage material being selected from the group consisting of Mg, K, Na, Sr and Ca is 0.1-0.5 mol per 1-liter volume of said support substrate.

4. The sulfur storage catalyst as set forth in claim 1, wherein Ba is supported on said upstream-side catalytic portion.

* * * * *